United States Patent Office

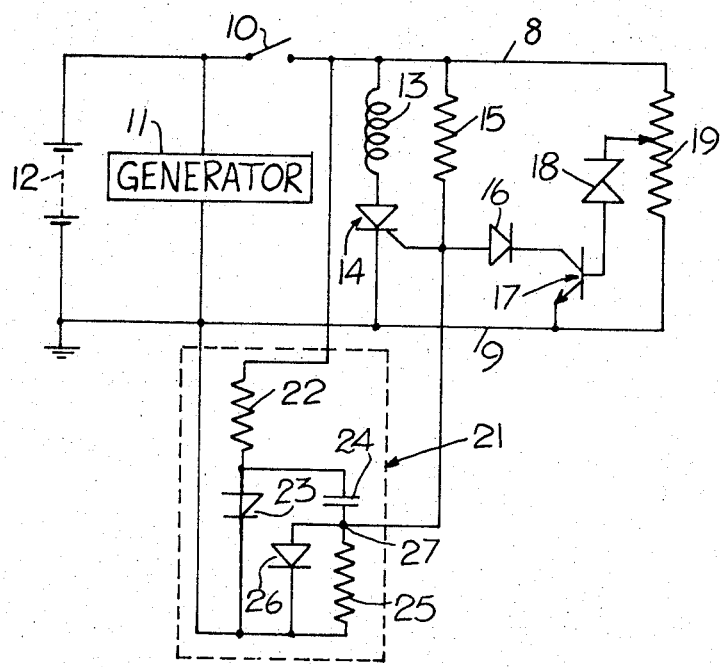

3,350,627
Patented Oct. 31, 1967

3,350,627
VOLTAGE REGULATORS
Maurice James Wright, 15 Stanley Ave., Harborne, Birmingham, England
Filed Mar. 24, 1967, Ser. No. 625,674
Claims priority, application Great Britain, Nov. 1, 1961, 39,064/61
4 Claims. (Cl. 322—28)

ABSTRACT OF THE DISCLOSURE

A voltage regulator in which current flows to the field winding of a generator through a gate controlled switch. The gate controlled switch is turned off periodically by negative pulses, but then is turned on by a positive bias unless the output voltage is above a predetermined value, in which case the positive bias is removed.

---

This invention is a continuation-in-part of my application No. 233,629 filed Oct. 29, 1962, and entitled, "Voltage Regulators."

Where a generator has a field winding, then the output voltage of the generator can be controlled by varying the current flow in the field winding. It has, for example, been proposed to control the output voltage of the generator of a road vehicle by employing a transistor in series with the field winding of the generator. The output voltage of the generator is sensed by any convenient means, for example a Zener diode, and the transistor is turned on when the output voltage is below a predetermined value, so that field current flows and the output voltage increases, and then is turned off when the output voltage exceeds the predetermined value, so that field current ceases to flow and the output falls again. One of the problems with a system of this sort is that the transistor tends to dissipate a large amount of heat, which very often is unacceptable, and for this reason alternative voltage regulators are to be desired. The thyristor is another element which can be inserted in series with the field winding, to act as a switch in much the same way as the transistor. However, whilst such a system is eminently suitable for A.C. networks, it is not suitable for D.C. networks, because the thyristor can only be turned off by reversing the voltage across it.

There has recently been developed a device which has all the properties of a thyristor, but has the additional property that current flowing through the anode-cathode path of the device can be turned off by a negative flow of current between its gate and cathode. The device in question is now commonly referred to as a gate controlled switch. Thus, in both the thyristor and the gate controlled switch, a positive pulse of current between the gate and cathode allows anode-cathode current to flow, even when the gate-cathode pulse is removed. In the thyristor, the anode-cathode flow cannot be stopped by a signal applied to the gate, but in the gate controlled switch a negative pulse between the gate and cathode stops the anode-cathode current flow.

In theory, there is no basic difficulty in utilizing a gate controlled switch in a voltage regulator. The switch can be inserted in the circuit so that its anode-cathode path is in series with the field winding, and all that is then necessary is to turn the switch on so long as the generator output is below a predetermined value, and then to turn the switch off when the generator output exceeds the predetermined value. This could be done, for example, by biasing the gate positively, and then causing a Zener diode to break down at a predetermined generator voltage, and connect the gate to a negative source so that the gate controlled switch turns off. In this way, the gate controlled switch would control the field winding current to regulate the output voltage of the generator. However, in a practical system, for example the battery charging system of a road vehicle, a scheme as envisaged above would be highly inconvenient, because it is necessary to provide not only a positive terminal for supplying current to turn the gate controlled switch on, but also a negative terminal for providing current to switch the gate controlled switch off. Such an arrangement means that neither terminal of the battery of the vehicle can be earthed, and clearly this is highly inconvenient.

It is an object of the present invention to overcome these disadvantages and provide a voltage regulator utilising a gate controlled switch which can work with an earthed negative battery terminal. In order to do this, the regulator is made to operate in a somewhat different way from a conventional regulator. Thus, it is known that a negative pulse can be derived from a D.C. source, even though the negative source terminal is earthed, but of course this negative pulse will only have short duration. In the present invention, a gate controlled switch is connected in series with the field winding of a generator, and a positive bias current is provided to the gate of the gate controlled switch to turn it on. The generator also operates a pulse generator which provides negative pulses only to the gate, and the arrangement is such that these negative pulses over-ride the positive bias and turn the gate controlled switch off momentarily. Thus, assuming that the output of the generator is below a predetermined value, the gate controlled switch will conduct until a negative pulse is received from the pulse generator, at which instant the gate controlled switch will be turned off during the pulse from the pulse generator. As soon as the pulse from the pulse generator ends, the positive bias turns the gate controlled on again. In addition, means is provided for sensing the output voltage, and when the output voltage is above a predetermined value, an alternative path for the positive bias is provided whereby the positive bias does not turn the gate controlled switch on again. Thus, considering for example that the output voltage of the generator rises above the predetermined value during the period between two negative pulses being received from the pulse generator, then the positive bias will be removed during this period, but the gate controlled switch will, of course, still stay on. When the next negative pulse is received from the pulse generator, the gate controlled switch will be turned off, but at the termination of the negative pulse, the gate controlled switch will not be turned on again because the positive bias has been removed. It should be noted that although current flow to the field winding is interrupted during the negative pulses even when the output voltage of the generator is below the predetermined value, this does not matter, because the system can be designed to provide adequate field current in spite of these breaks in flow of current.

The precise scope of the invention will be seen from the attached claims, but for a better understanding of the invention reference is now directed to the accompanying drawing, which is a circuit diagram illustrating one example of the invention.

Referring to the drawing, there is illustrated part of the battery charging system of a road vehicle, the system including supply lines 8, 9, the line 8 being connected to the positive terminal of the vehicle battery 12 through the ignition switch 10 of the vehicle, and the line 9 being connected to the negative battery terminal, which is earthed. The battery 12 is charged by a generator 11 connected across it, the generator either being in the form of a dynamo and associated cut out, or an alternator and associated full wave rectifier. In either case, the generator 11 includes a field winding 13 one end of which is connected to the line 8 and the other end of which is connected to the line 9 through the anode-cathode of a gate controlled switch 14. The gate of the switch 14 is connected through a resistor 15 to the line 8, and is further connected to the anode of the diode 16, the cathode of which is connected to the collector of an n-p-n transistor 17. The transistor 17 has its emitter connected to the line 9, and its base connected to the anode of a Zener diode 18, the cathode of which is connected to a variable point on a resistor 19 bridging the lines 8, 9.

The system further includes a pulse generator indicated generally by reference 21, the generator 21 being connected across the lines 8, 9. The pulse generator 21 includes a resistor 22 one end of which is connected to the line 8, and the other end of which is connected to the line 9 through a four layer diode 23. The junction of the resistor 22 and diode 23 is connected to the line 9 through a capacitor 24 and a resistor 25 in series, the resistor 25 being bridged by a diode 26. The junction 27 of the capacitor 24 and resistor 25 constitutes an output terminal from the pulse generator, and is connected to the gate of the gate controlled switch 14.

Before describing the overall circuit, it will be convenient to indicate the operation of the pulse generator 21, which is of conventional known form. Assuming the supply is connected, current from the line 8 flows through resistor 22, capacitor 24 and diode 26 to charge the capacitor 24. Thus, the voltage across the capacitor 24 increases, until a point is reached at which the four layer diode 23 breaks down. At this point, the capacitor 24 discharges through the diode 23 and the resistor 25, and a negative pulse appears at terminal 27. It should be particularly noted that the pulse will be negative with respect to the earth line 9. As soon as the capacitor 24 has discharged, the four layer diode 23 ceases to conduct, and the cycle re-commences. Thus, the generator 21 produces a succession of negative pulses which are applied to the gate of the gate controlled switch 14 for a purpose to be described.

Considering now in more detail the overall operation of the system, it will be convenient to assume first that the voltage between the lines 8, 9 is below a value which can be predetermined by varying the setting of the slider on the resistor 19. In these circumstances, then assuming the power supply to be connected, current flows through the resistor 15 and the gate and cathode of the switch 14, to turn the switch 14 on. Full field current now flows in the winding 13, and so the generator output tends to increase. A short while after the power supply is connected, a negative pulse is produced at the terminal 27, and this negative pulse flows between the gate and cathode of the switch 14. The various circuit parameters can readily be chosen without any difficulty so that the negative pulse has an amplitude in excess of the positive bias flowing through the resistor 15, and furthermore has a duration sufficient to ensure that the gate controlled switch 14 is turned off by the negative pulse. At the termination of the negative pulse, however, the current flowing through the resistor 15 immediately turns the gate controlled switch 14 on again so that the field current is restored. Thus, with the output voltage below the predetermined value, an interrupted current will flow through the winding 13, the arrangement being such that this current is adequate to raise the generator output.

As soon as the predetermined voltage is reached, the Zener diode 18 conducts, and current can flow from the line 8 through the Zener diode 18 and the base and emitter of transistor 17 to turn the transistor 17 on. The current flowing through the resistor 15 is now diverted through the diode 16 and the collector-emitter path of the transistor 17. Assuming that the Zener diode breaks down at an instant between receipt of negative pulses from the pulse generator 21, then the removal of gate current from the switch 14 will not affect its condition. However, when the next negative pulse is received, it will turn the gate controlled switch 14 off as before, but now the curernt flowing through the resistor 15 will not turn the gate controlled switch 14 on again at the termination of the negative pulse. In this respect it should be noted that the voltage drop across the diode 16 and the collector-emitter of the transistor 17 will be insufficient to provide sufficient gate-cathode current to the switch 14 to turn it on at the end of the negative pulse. The situation now is that the voltage is above the predetermined value, and no field current flows in the winding 13. Of course, as soon as the voltage falls below the predetermined value again, Zener diode 18 ceases to conduct, and current can flow through the resistor 15 to turn the gate controlled switch 14 on so that the operation is as previously described. The overall effect is that the voltage between the lines 8, 9 is maintained substantially constant. In practice there will, of course, be variation in the voltage and it is more accurate to state that the voltage between the lines 8, 9 is regulated between predetermined closely spaced values.

It will, of course, be appreciated that the invention can be modified in a number of ways, and in particular the voltage sensing need not be achieved by a Zener diode 18. The important feature of the invention is that the gate controlled switch 14 is biased on from a positive supply, and then is turned off periodically by negative pulses from a pulse generator. Some convenient form of voltage sensing network, which may be the Zener diode 18, or some form of relay or some other means, is then used to divert the positive bias when the predetermined voltage is reached, so that the next negative pulse not only turns the gate controlled switch 14 off, but allows the gate controlled switch 14 to remain off until the generator output again falls to the predetermined value.

Having thus described my invention what I claim as new and desire to secure by Letters Patent is:

1. A voltage regulator for controlling the output voltage of a generator having a field winding, comprising in combination a gate controlled switch having an anode, a cathode and a gate, the anode and cathode of said gate controlled switch being connected in series with said field winding, and said gate controlled switch being switched on by a positive voltage applied between its gate and cathode, by being switched off by a negative voltage applied between its gate and cathode, means providing a positive voltage at the gate of said gate controlled switch to render it conductive, means operable by the output from said generator for supplying negative pulses intermittently to the gate of said gate controlled switch to switch it off, said gate controlled switch being switched on again on removal of each negative pulse by said positive voltage, voltage sensitive means connected across said generator output and adapted to operate when the output of the generator exceeds a predetermined value, and means coupled to said voltage sensitive means for removing said positive voltage from said gate controlled switch when said voltage sensitive means operates.

2. A regulator as claimed in claim 1 in which said voltage sensitive means comprises a Zener diode.

3. A voltage regulator for controlling the output voltage of a generator having a field winding and positive and negative output terminals, said negative output terminal being earthed, the voltage regulator comprising a gate controlled switch having an anode, a cathode and a gate, said gate controlled switch having its anode and cathode connected in series with said field winding between said positive and earthed output terminals, and said gate controlled switch being switched on by a positive voltage applied between its gate and cathode and being switched off by a negative voltage applied between its gate and cathode, a resistor connecting the gate of said gate controlled switch to said positive terminal, current flowing through said resistor and the gate and cathode of said gate controlled switch to turn said gate controlled switch on, a pulse generator connected between said positive and earthed terminals, said pulse generator having an output terminal at which the pulse generator produces intermittent pulses which are negative in polarity with respect to said earth terminal, means coupling the output terminal of said pulse generator to the gate of said gate controlled switch, whereby each negative pulse from said pulse generator turns said gate controlled switch off, said gate controlled switch being turned on again by current flowing through said resistor when said negative pulses terminate, voltage sensitive means coupled to said positive and earth terminals and adapted to conduct when the output voltage of said generator reaches a predetermined value, and means operable on conduction of said voltage sensitive means for diverting the current flowing through said resistor so that the gate controlled switch is not turned on by current flow through said resistor.

4. A voltage regulator as claimed in claim 3 in which said means operable on conduction of said voltage sensitive means comprises a diode and a transistor, said diode having its anode connected to the gate of said gate controlled switch and its cathode connected to said earthed terminal through the collector-emitter path of said transistor, and said voltage sensitive means comprising a Zener diode connected between the positive and earth terminals in series with the base-emitter circuit of said transistor.

References Cited

UNITED STATES PATENTS

| | | | |
|---|---|---|---|
| 3,009,091 | 11/1961 | Hallidy | 322—28 |
| 3,230,442 | 1/1966 | Korda | 322—28 |
| 3,230,443 | 1/1966 | Hallidy | 322—28 |

MILTON O. HIRSHFIELD, *Primary Examiner.*

J. D. TRAMMEL, *Assistant Examiner.*